United States Patent
Zhang et al.

(10) Patent No.: US 11,340,924 B2
(45) Date of Patent: May 24, 2022

(54) MACHINE-LEARNING BASED HEAP MEMORY TUNING

(71) Applicant: International Business Machines Corporation, Armonk, NY (US)

(72) Inventors: Hong Bing Zhang, Beijing (CN); Huan Da Wang, Beijing (CN); Wei Peng Huang, Beijing (CN); Yi Yao, Beijing (CN); Hong Chen, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 459 days.

(21) Appl. No.: 16/454,251

(22) Filed: Jun. 27, 2019

(65) Prior Publication Data

US 2020/0409731 A1    Dec. 31, 2020

(51) Int. Cl.
  *G06F 9/455*    (2018.01)
  *G06F 12/02*    (2006.01)
  *G06F 9/50*    (2006.01)
  *G06K 9/62*    (2022.01)

(52) U.S. Cl.
  CPC ...... *G06F 9/45504* (2013.01); *G06F 9/45533* (2013.01); *G06F 9/5016* (2013.01); *G06F 9/5027* (2013.01); *G06F 12/0253* (2013.01); *G06K 9/6256* (2013.01)

(58) Field of Classification Search
  CPC ............. G06F 9/45504; G06F 9/45533; G06F 9/5016; G06F 9/5027; G06F 12/0253; G06N 3/088; G06N 3/084
  See application file for complete search history.

(56) References Cited

U.S. PATENT DOCUMENTS

| | | | |
|---|---|---|---|
| 7,475,214 B2 | 1/2009 | Hwang | |
| 7,870,170 B2 | 1/2011 | Achanta | |
| 8,583,783 B1 | 11/2013 | Hayward | |
| 9,852,011 B1* | 12/2017 | Yemini | .............. G06Q 10/0631 |
| 10,205,640 B2 | 2/2019 | Chan | |

(Continued)

FOREIGN PATENT DOCUMENTS

CN    105824687 A    8/2016

OTHER PUBLICATIONS

Andreasson et al., "To Collect or Not To Collect? Machine Learning for Memory Management", printed on Jun. 21, 2019, 13 pages, <http://citeseerx.ist.psu.edu/viewdoc/download?doi=10.1.1.15.1671&rep=rep1&type=pdf>.

(Continued)

*Primary Examiner* — Emerson C Puente
*Assistant Examiner* — Zhi Chen
(74) *Attorney, Agent, or Firm* — Randy E. Tejeda

(57) ABSTRACT

In an approach for JAVA Virtual Machine (JVM) heap memory tuning, one or more computer processors obtain a feature vector of an application running on the JVM. The one or more computer processors input the feature vector to a predictive model trained with historical application data collected in one or more production environments. The one or more computer processors receive an output of the predictive model based on the feature vector with at least one memory tuning recommendation for the JVM. The one or more computer processors tune the memory of the JVM based on the at least one memory tuning recommendation.

17 Claims, 5 Drawing Sheets

(56) References Cited

U.S. PATENT DOCUMENTS

| | | | |
|---|---|---|---|
| 2006/0167960 A1* | 7/2006 | Lomet | G06F 16/2322 |
| 2007/0136402 A1 | 6/2007 | Grose | |
| 2012/0060146 A1 | 3/2012 | Maurer | |
| 2012/0123991 A1* | 5/2012 | Arndt | G06K 9/6282 |
| | | | 706/50 |
| 2012/0310618 A1 | 12/2012 | B'Far | |
| 2013/0124807 A1* | 5/2013 | Nielsen | G06F 3/0619 |
| | | | 711/E12.103 |
| 2013/0290536 A1* | 10/2013 | Dutta | G06F 9/5027 |
| | | | 709/226 |
| 2014/0137104 A1* | 5/2014 | Nelson | G06F 9/45558 |
| | | | 718/1 |
| 2014/0310235 A1 | 10/2014 | Chan | |
| 2015/0026429 A1* | 1/2015 | Bobroff | G06F 3/0631 |
| | | | 711/171 |
| 2015/0067170 A1* | 3/2015 | Zhang | H04L 47/70 |
| | | | 709/226 |
| 2016/0071023 A1* | 3/2016 | Eicher | G06N 5/025 |
| | | | 706/12 |
| 2016/0253103 A1 | 9/2016 | Foley | |
| 2017/0010963 A1 | 1/2017 | Bobroff | |
| 2017/0322861 A1* | 11/2017 | Chan | G06F 11/3452 |
| 2019/0182195 A1* | 6/2019 | Avital | H04L 67/22 |
| 2019/0213685 A1* | 7/2019 | Ironside | G06N 5/003 |
| 2021/0273858 A1* | 9/2021 | Radovanovic | H04L 41/12 |

OTHER PUBLICATIONS

Mell et al., "The NIST Definition of Cloud Computing", NIST National Institute of Standards and Technology U.S. Department of Commerce, Special Publication 800-145, Sep. 2011, 7 pages.

Singer et al., "Garbage Collection Auto-Tuning for Java MapReduce on Multi-Cores", Proceedings of the International Symposium on Memory Management, 2011, ©ACM 2011, 10 pages, <https://pdfs.semanticscholar.org/8565/6084b59edef3de5f9a538712383d2a2e99bd.pdf>.

Wang et al., "Toward Elastic Memory Management for Cloud Data Analytics", BeyondMR'16, June 26-Jul. 1, 2016, San Francisco, CA, USA, ©2016 ACM, 4 pages, <https://homes.cs.washington.edu/~jwang/publications/elasticmem-beyondmr.pdf>.

* cited by examiner

MACHINE-LEARNING BASED HEAP MEMORY TUNING

BACKGROUND

The present invention relates generally to the field of computing and more particularly to JAVA Virtual Machine (JVM) heap memory tuning.

JVM is a virtual machine that enables a computing device to run JAVA programs as well as programs written in other languages that are compiled to JAVA bytecode. Automatic garbage collection (GC) in JVM is the process of looking at heap memory (e.g., storage for JAVA objects), identifying the objects that are active/inactive, deleting the unused objects. An active object (i.e., referenced object) is an object that has a program maintaining a pointer to said object. An inactive object (i.e., unreferenced object) is an object that is no longer referenced by any programs, thus the memory utilized by an unreferenced object can be safely reclaimed. While automatic garbage collection enables automatic memory management in JVM, it also has several disadvantages including additional overhead, additional required resources, performance impacts, and possible stalls in program execution, especially if JVM is not configured properly. Proper JVM heap memory tuning is essential for a stable and efficient production environment.

SUMMARY

Embodiments of the present invention disclose a method, a computer program product, and a system for JAVA Virtual Machine (JVM) heap memory tuning. The method includes one or more computer processors obtaining a feature vector of an application running on the JVM. The one or more computer processors input the feature vector to a predictive model trained with historical application data collected in one or more production environments. The one or more computer processors receive an output of the predictive model based on the feature vector with at least one memory tuning recommendation for the JVM. The one or more computer processors tune the memory of the JVM based on the at least one memory tuning recommendation.

DETAILED DESCRIPTION

Figure 1:
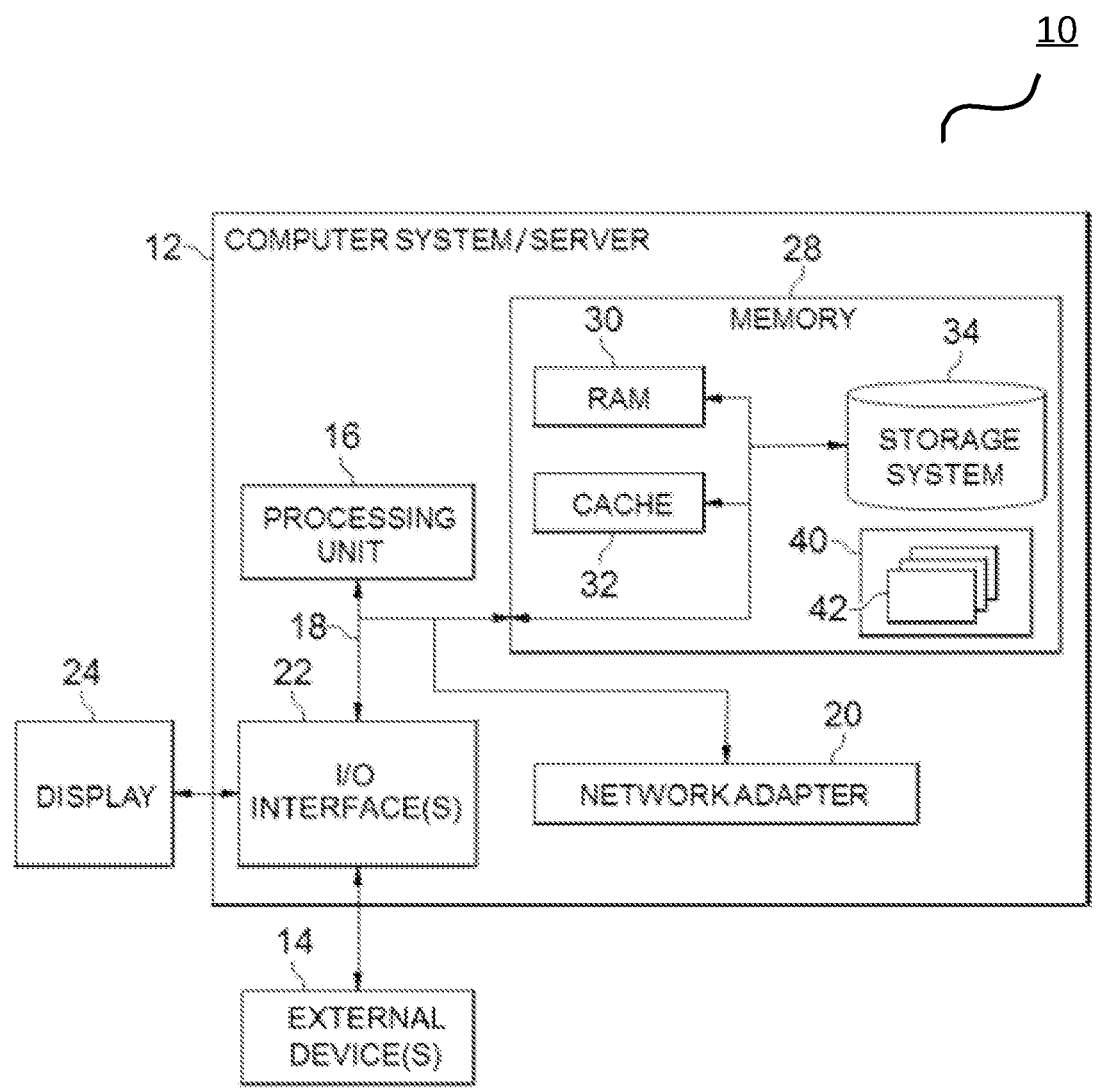
FIG. 1 depicts a cloud computing node, in accordance with an embodiment of the present invention.

JVM heap memory tuning is essential for stable and reliable production environments. Embodiments of the invention recognize that out of memory errors frequently occur if JVM heap memory is set too small, contrastingly, large GC overhead occurs when performing a full GC if JVM heap memory is set too large. However, current JVM heap memory tuning approaches heavily rely on inflexible, rigid, and expensive domain experts.

Embodiments of the invention recognize the issues stated above and can be deployed on cloud systems to alleviate said issues. Embodiments of the present invention recognize that system requirements, system performance, and memory utilization/requirements are improved through effective JVM heap tuning. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed. Implementation of embodiments of the invention may take a variety of forms, and exemplary implementation details are discussed subsequently with reference to the Figures.

The present invention will now be described in detail with reference to the Figures.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

In various embodiments, the term "JAVA" should be construed having a broad meaning and include all JAVA based programming languages (e.g., class based, object-oriented, etc.). In another embodiment, the term "JAVA" may be construed to include an application, module, or program based on the JAVA programming language.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

FIG. 1 is a schematic depicting an example of a cloud computing node, in accordance with an embodiment of the present invention. Cloud computing node 10 is an example of a suitable cloud computing node and is not intended to suggest any limitation as to the scope of use or functionality of embodiments of the invention described herein. Cloud computing node 10 is capable of being implemented and/or performing any of the functionality set forth herein.

Cloud computing node 10 includes computer system/server 12 or a portable electronic device, such as a communication device, operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. In an embodiment, computer system/server 12 includes distributed cloud computing environments where tasks are performed by remote processing devices that are linked through a communications network. In a distributed cloud computing environment, program modules may be located in both local and remote computer system storage media including memory storage devices.

As depicted in FIG. 1, computer system/server 12, contained in cloud computing node 10, is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 includes computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating systems, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
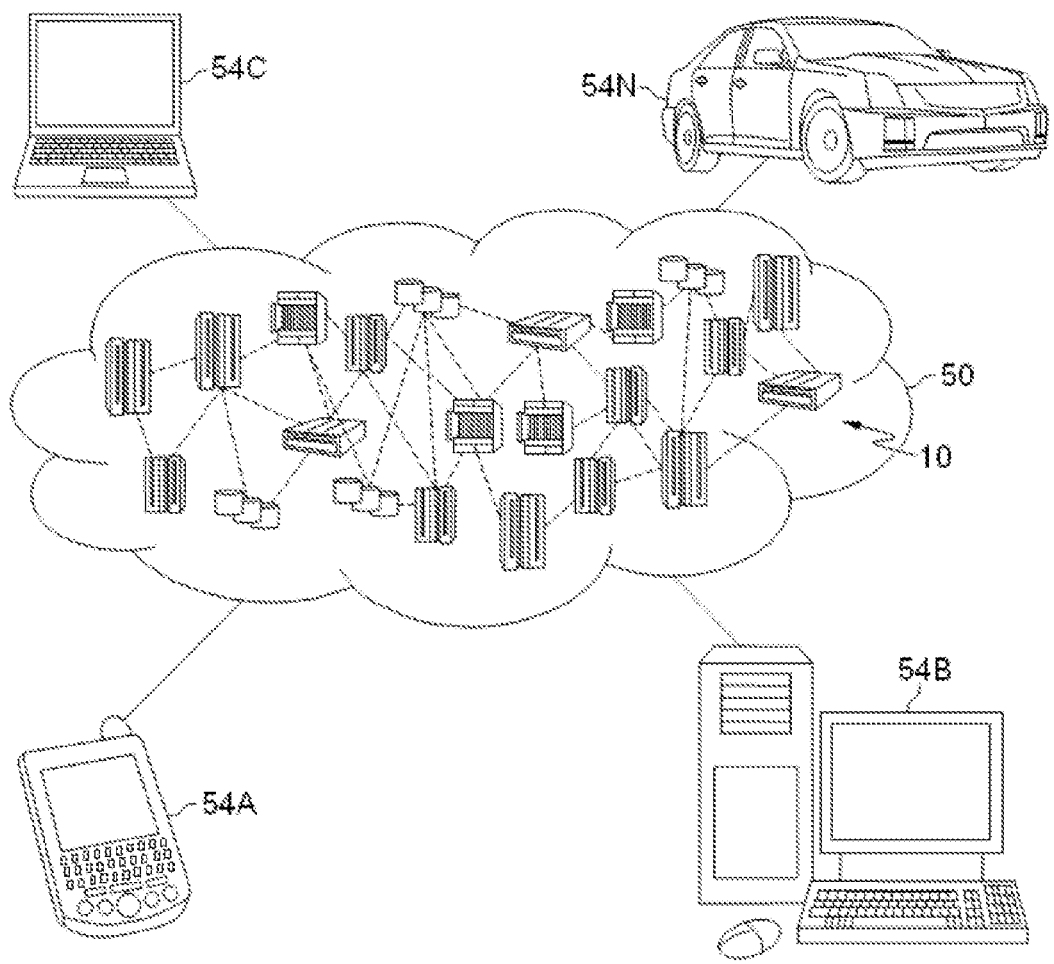
FIG. 2 depicts a cloud computing node, in accordance with an embodiment of the present invention.

FIG. 2 depicts cloud computing environment 50, in accordance with an embodiment of the present invention. As shown, cloud computing environment 50 includes one or more instances of cloud computing nodes 10 with local computing devices used by cloud consumers, such as, personal digital assistant (PDA) or cellular telephone 54A, desktop computer 54B, laptop computer 54C, and/or automobile computer system 54N. Cloud computing nodes 10 may communicate with one another. Cloud computing nodes 10 may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
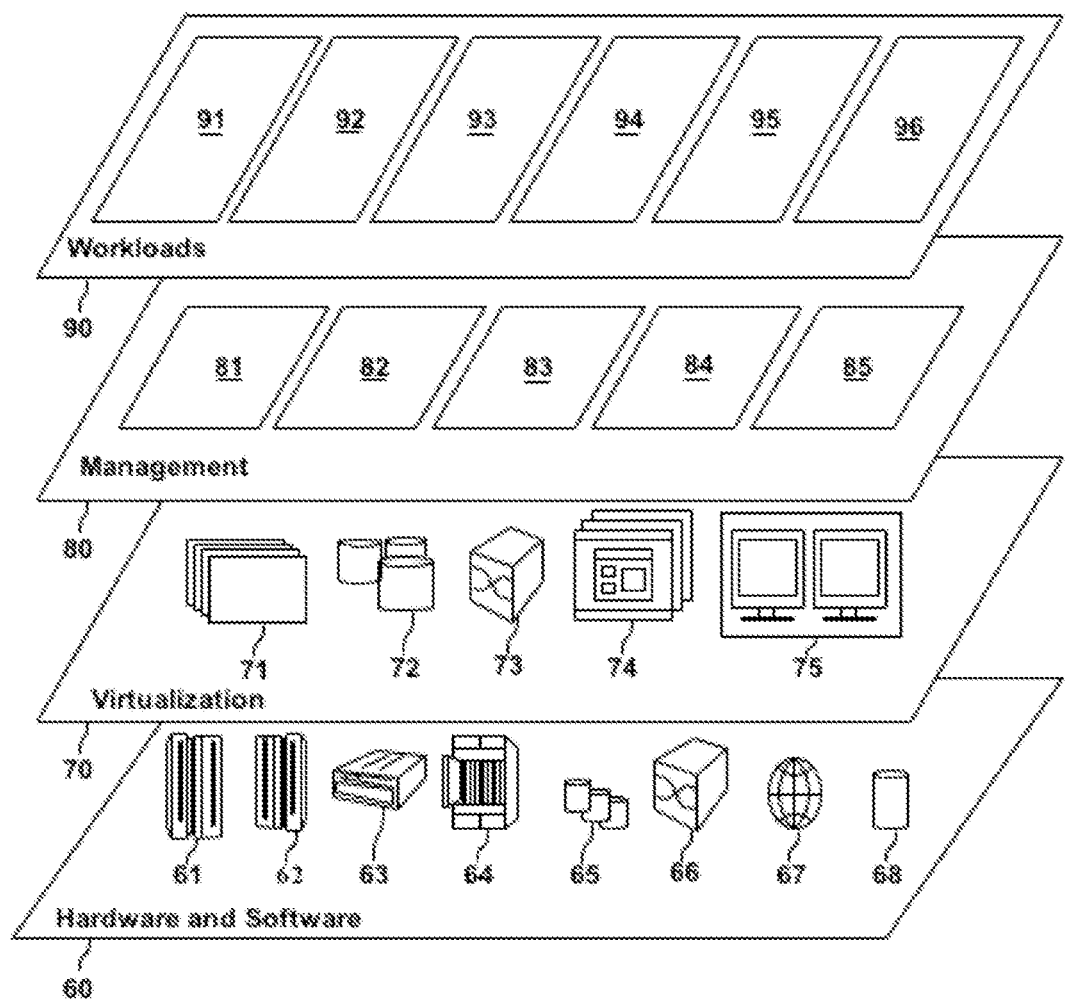
FIG. 3 depicts abstraction model layers, in accordance with an embodiment of the present invention.

FIG. 3 depicts a set of functional abstraction layers provided by cloud computing environment 50, in accordance with an embodiment of the present invention. It should be understood that the components, layers, and functions shown in FIG. 3 are intended to be illustrative and embodiments of the invention are not limited thereto. As depicted, the following layers and corresponding functions are provided:

Hardware and software layer 60 include hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and JVM heap memory tuning 96 according to embodiments of the invention.

In various embodiments, JVM heap memory, the storage for JAVA objects, is the runtime data area created at a JVM start-up for which memory for all class instances and arrays are allocated. A JVM allows an application to have multiple threads of execution running concurrently and JVM heap memory is shared among all threads. When the heap memory of a JVM becomes full, garbage is collected by an automatic garbage collection (GC) process which transverses associated heap memory, identifies which objects are active/inactive, and deletes the unused objects. In an embodiment, an active object, or a referenced object, signifies that a program is still maintaining a pointer to said object. An inactive, unused object, or unreferenced object, is an object that is no longer referenced by any program, thus memory used by an unreferenced object can be reclaimed and reallocated. In another embodiment, JAVA heap memory tuning is the process to tune a JVM heap memory such that the application running in the JVM will gain the best performance with optimal memory constraints.

Figure 4:
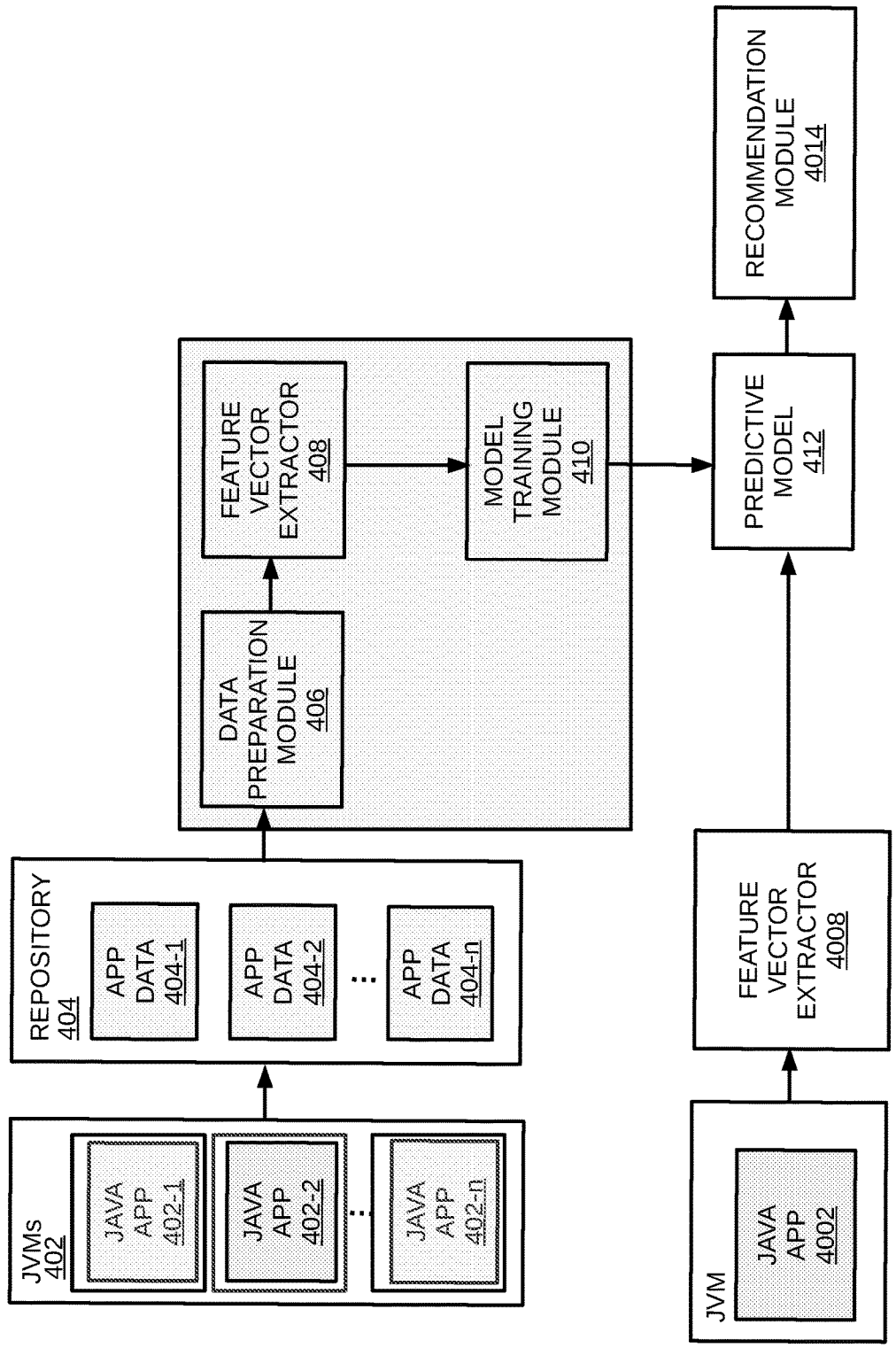
FIG. 4 is a block diagram of an exemplary system 400 for JVM heap memory tuning, in accordance with an embodiment of the present invention.

FIG. 4 depicts a block diagram of an exemplary system 400 for JVM heap memory tuning, in accordance with an embodiment of the present invention. In FIG. 4, multiple JAVA applications 402-1, 402-2, . . . , 402-n running in respective JVMs 402 in production environments are shown. Here, a JAVA application refers to any type of application that is able to run in a JVM. The respective JVMs may run in cloud environments and may be managed and monitored by JVM management components (not shown) which conform to JAVA Management Extensions (JMX) specifications. JVM management components monitor multiple JAVA applications running in respective JVMs and generate corresponding application data 404-1, 404-2, . . . , 404-n. Application data 404-1, 404-2, . . . , 404-n may be acquired and stored in a repository 404 coupled to the multiple JVMs hosting the respective JAVA applications. Application data 404-1, 404-2, . . . , 404-n, according to an embodiment of the invention, may be in the form of logs and may include, for example the following types of information including, application type (i.e., the type of a JAVA application running in a JVM), workload (i.e., the workload of a JAVA application running in a JVM), CPU specification (i.e., the number of CPU cores in a JVM system), RAM specification (i.e., the available memory space in a JVM system), topology (i.e., the topology of a JAVA application), data size (i.e., the data size accessed by a JAVA application running in a JVM), third-party framework (i.e., the third party framework invoked by a JAVA application running in a JVM), etc. According to embodiments of the invention, application data may comprise one or more aspect listed above.

According to an embodiment of the invention, exemplary system 400 may comprise a predictive model training component that trains an instance of predictive model 412 with application data retrieved from the repository 404. In an embodiment, trained predictive model 412 is utilized to tune the heap memory of a JVM when a new JAVA application is deployed in the JVM. The predictive model training component comprises data preparation module 406, feature vector extractor 408, and model training module 410. According to an embodiment of the invention, a machine learning process is invoked to train predictive model 412. Machine learning is a process of data analysis that automates analytical model building. It can provide the ability to automatically learn and improve from experiences without being explicitly programmed. Machine learning is a branch of artificial intelligence based on the idea that systems can learn from data, identify patterns, and make decisions with minimal human intervention.

Data preparation module 406 of the predictive model training component prepares data by selecting data required for the training of predictive model 412 from application data 404-1, 404-2, . . . , 404-n received from the repository 404. According to an embodiment of the invention, data preparation module 406 selects application data that are within a specified range (e.g., GC heap usage within 40% and 70% of max heap settings), within a user specified range, specified by JAVA programmatic conventions, or organizational programmatic standards. As aforementioned, if the size of the heap memory in a JVM is set too small, an out of memory error is likely to occur. If the size of the heap memory in a JVM is set too large, the system will experience significant increased GC overhead when performing a full GC resulting in a systemic loss of useable memory. In an embodiment, an organizational JVM memory tuning standard may require that for a JVM in production environments GC heap memory usage is required to remain within a 40%-70% occupancy range of the maximum heap memory setting and the time spent on GC should remain within a 5%-10% range of execution time. Frequent GC cycles are caused by heap memory occupancy meeting or exceeding an upper threshold of the maximum heap memory setting. Similarly, infrequent GC cycles (signifying longer pauses between GCs) are caused by heap memory occupancy failing to reach a lower threshold of the maximum heap memory setting. According to an exemplary JAVA heap memory tuning convention, GC heap memory usage must remain between 40% to 70% of the maximum heap memory setting and the time spent on GC must remain within 5% of the execution time. It should be noted that the examples stated above (40% to 70% and 5%) are only for the purpose of illustration, other possible conventions, ranges, or standards may also be adopted dependent on associated production environments. Data preparation module 406 ensure that application data remains reliable, accurate, and sufficient to effectively train predictive model 412.

Feature vector extractor 408, of the predictive model training component, extracts features from each of the selected application data (i.e., compliant application data) and constructs a corresponding feature vector. Said constructed feature vector is fed as an input of model training module 410 to train the predictive model 412. In various embodiments, application data may include various types of information in the form of logs. Features extracted from the various types of information to train predictive model 412 may include application type, workload, CPU specification, RAM specification, topology, and data size according to an embodiment of the invention. For example, in a scenario where data access is not a key consideration, data size may not be included. Alternatively, in a scenario where third-party framework is a key consideration, the third-party framework is included.

According to an embodiment of the invention, feature extraction from the selected application data may adopt any existing approaches known in the art, for example, by one or more automatic log analysis techniques. In an embodiment, a feature vector for each of the selected application data is built by assigning a value for each of the extracted features. The assigned value may be a pre-determined numeric value corresponding to an extracted feature. For example, for the extracted feature 'application type', a pre-determined value 1 may be assigned corresponding to an application of 'commerce transaction', a pre-determined value 2 may be assigned corresponding to an application of 'report', or a pre-determined value 3 may be assigned corresponding to an application of 'files'. The assigned value may retrieved from the application data, for example, for the extracted feature 'workload', the retrieved actual transaction per second (TPS) is 500 transaction per second. In various embodiments, values for the extracted features for each of the selected application data may further be normalized to construct a normalized feature vector. The extraction of features and the construction of respective feature vectors for the selected application data may adopt any appropriate measures known in the art. According to an embodiment of the invention, an example of a constructed feature vector is in the following normalized form and represents corresponding selected application data:

$X_i = \{X_{i1}, X_{i2}, X_{i3}, X_{i4}, X_{i5}, \ldots X_{in}\}$ in which:

$X_i$ is the feature vector constructed with extracted features of a corresponding selected application data;

$X_{i1}$ is the normalized value for the type of JAVA application running in a JVM (the types may include commerce transactions, reports, files, blogs, wikis, social media data, search app nodes, etc.);

$X_{i2}$ is the normalized value for the workload of a JAVA application running in a JVM (the workload may be represented as transaction per second (TPS) or any other appropriate formats);

$X_{i3}$ is the normalized value for the number of CPU cores in a JVM system;

$X_{i4}$ is the normalized value for the available memory space in a JVM system;

$X_{i5}$ is the normalized value for the topology of a JAVA application running in a JVM; and $X_{in}$ is the normalized value for the extracted feature n.

Responsive to the feature vectors being constructed by feature vector extractor 408 as the input, representing the selected application data, model training module 410 of the predictive model training component trains predictive model 412, used for JVM heap memory tuning. According to embodiments of the invention, any existing machine learning techniques, algorithm, or models may be used for the training of predictive model 412, such as deep learning methods, supervised, semi-supervised, or unsupervised.

Training, in a deep learning method is the phase in which the network tries to learn from the data. In deep learning, each layer learns to transform its input data into a slightly more abstract and composite representation. In the training phase, each layer of the data is assigned one or more random weights and the classifier runs a forward pass through the data, predicting the class labels and scores using said weights. The class scores are then compared against the actual labels and an error is computed via a loss function. This error is then back propagated through the network and weights are updated accordingly utilizing a weight update algorithm such as Gradient Descent.

A complete pass through all training samples is called an epoch. Epochs are computationally expensive due to the fact that only a single weight update is performed after going through every sample. In practice, the data is divided into batches and updated. Predictive model 412 may be trained with the selected application data represented by the constructed feature vectors utilizing deep learning methods. The input of trained predictive model 412 is a feature vector represents a JAVA application running in a JVM. The output of trained predictive model 412 corresponds to JVM heap memory tuning recommendations. In an embodiment, JVM heap memory tuning recommendations includes values of minimum size of heap memory, maximum size of heap memory, and GC policy. In various embodiments, recommendation module 4014 provides JVM heap memory tuning recommendations (e.g., minimum size of heap memory, maximum size of heap memory, and GC policy) based on the output of the trained predictive model. For example, responsive to a new JAVA application 4002 deployment in a JVM, feature vector extractor 4008 (feature vector extractor 4008 and feature vector extractor 408 may or may not be the same module) extracts features and constructs a feature vector for newly deployed JAVA application 4002. The constructed feature vector for the newly deployed JAVA application may be fed to predictive model 412 and based on the output of predictive model 412, heap memory tuning recommendations for the JVM are generated and provided. Responsive to the generated heap memory tuning recommendations, the heap memory of the JVM is tuned and updated.

According to an embodiment of the invention, a predicted workload for the newly deployed JAVA application may be used to extract features and construct corresponding feature vector. If, however, the actual workload for the JAVA application varies drastically from the predicted workload, the heap memory tuning of the JVM may deviate. It is imperative to adjust the heap memory tuning of the JVM according to the current production conditions. In various embodiments, an updated feature vector of the JAVA application is constructed based on updated features extracted from the application data of the JAVA application and fed to predictive model 412 so that the generated memory tuning recommendations can be provided based on the one or more calculations resulting in an updated output of predictive model 412. The heap memory of the JVM may be further tuned and adjusted based on the updated memory tuning recommendations.

In an embodiment of the invention, updated features may be extracted periodically, or alternatively, responsive to a verification of an incompliant or out of range heap memory tuning of the JVM, such as time spent on GC exceeding a maximum range of execution time. Responsively, the updated feature vector is constructed based on the updated features and fed to the predictive model. According to an embodiment of the invention, the updated feature vector may further be fed to model training predictive model 412, such that predictive model 412 may be further trained with the application data of the newly deployed JAVA application.

Predictive model 412 utilizes machine learning techniques with compliant application data as training data. Responsive to a new JAVA application deployment in a JVM a corresponding JVM heap memory may be tuned based on the output of trained predictive model 412 utilizing feature vectors constructed on features extracted from the JAVA application, significantly enhancing the flexibility of JVM heap memory tuning and freeing domain experts from tedious, time consuming, and expensive tuning work. In some embodiments, the application data of the newly deployed application is further fed to train the predictive model, thus optimizing the predictive model.

Figure 5:
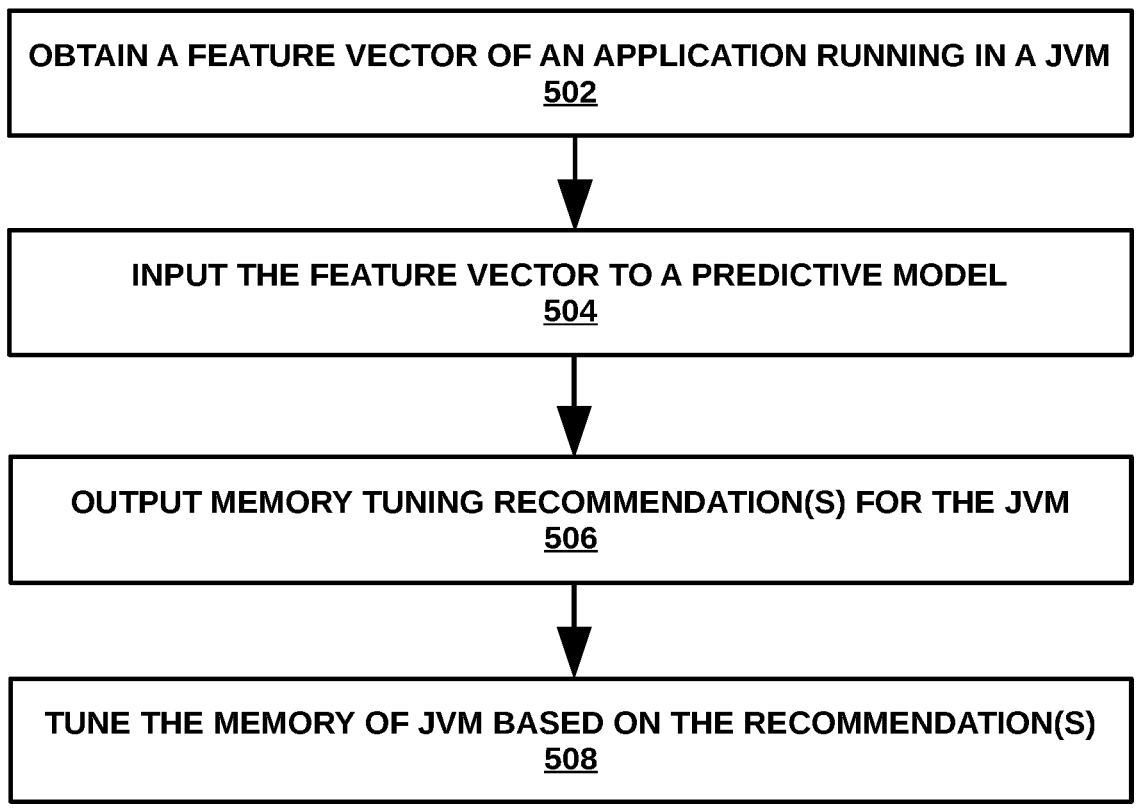
FIG. 5 depicts a flowchart of an exemplary method 500 for JVM heap memory tuning, in accordance with an embodiment of the present invention.

FIG. 5 depicts a flowchart of an exemplary method 500 for JVM heap memory tuning, in accordance with an embodiment of the present invention.

The present invention may contain various accessible data sources that may include personal storage devices and content the user wishes not to be used, program/utility 40 allows the user to opt in or opt out of exposing personal information. Program/utility 40 enables the authorized and secure handling of user information, such as tracking information, as well as personal information that may have been obtained, is maintained, and/or is accessible. The user can be provided with notice of the collection of portions of the personal information and the opportunity to opt-in or opt-out of the collection process. Consent can take several forms. Opt-in consent can impose on the user to take an affirmative action before the data is collected. Alternatively, opt-out consent can impose on the user to take an affirmative action to prevent the collection of data before that data is collected.

In step 502, a feature vector of an application running in a JVM is obtained. According to an embodiment of the invention, the feature vector is constructed with features extracted from the application data of the application. According to an embodiment of the invention, the feature vector of includes at least one of the following features: a type of the application, a workload of the application, a number of CPU cores, an available memory, a topology of the application, a data size accessed by the application. According to an embodiment of the invention, the feature vector may be in the following normalized form and represents corresponding selected application data:

$X_i = \{X_{i1}, X_{i2}, X_{i3}, X_{i4}, X_{i5}, \ldots X_{in}\}$ in which, $X_i$ is the extracted feature vector a corresponding selected application data;

$X_{i1}$ is the normalized value for the type of a JAVA application running in a JVM (the type may be for example, commerce transaction, report, files, blogs, wikis, social media, search app node, etc.);

$X_{i2}$ is the normalized value for the workload of a JAVA application running in a JVM (the workload may be presented as transaction per second (TPS), or any other appropriate formats);

$X_{i3}$ is the normalized value for the number of CPU cores in a JVM system;

$X_{i4}$ is the normalized value for the available memory space in a JVM system;

$X_{i5}$ is the normalized value for the topology of a JAVA application running in a JVM; and $X_{in}$ is the normalized value for the extracted feature n.

According to an embodiment of the invention, a predicted workload for the newly deployed JAVA application may be used to extract features and construct corresponding feature vectors.

In step 504, the feature vector is inputted to a predictive model. According to an embodiment of the invention, the predictive model is trained with data selected from application data in production environments associated with one or more parameters or settings controlling JVM heap memory tuning. The training of the predictive model has been detailed above.

In step 506, at least one JVM heap memory tuning recommendation based on the output of the predictive model, is received. According to an embodiment of the invention, the output of the predictive model comprises values of minimum size of heap memory, maximum size of heap memory, and GC policy. At least one JVM heap memory tuning recommendation is provided based on the values. Responsive to the receipt of at least one JVM heap memory tuning recommendation, the heap memory of the JVM is tuned based on said at least one recommendation.

According to an embodiment of the invention, an updated feature vector of the application may be obtained and inputted to the predictive model. The updated feature vector is based on updated features extracted from the actual application data of the application. The updated feature vector may be fed to the predictive model so that updated memory tuning recommendations are provided based on the updated output of the predictive model. Then the heap memory of the JVM may be further tuned based on the updated memory tuning recommendations.

According to an embodiment of the invention, the updated features may be extracted periodically, or alternatively, responsive to a verification of an incompliant or out of range heap memory tuning of the JVM, for example, the time spent on GC with current JVM heap memory tuning exceeds a maximum range of execution time. Responsively, the updated feature vector may be constructed based on the updated features and fed to the predictive model. According to an embodiment of the invention, the updated feature vector may further be fed to model training model of the predictive model training component, such that the predictive model may be further trained with the application data of the newly deployed JAVA application.

It should be noted that the content rendering according to embodiments of this disclosure are implemented by computer system/server 12 of FIG. 1.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, conventional procedural programming languages, such as the "C" programming language or similar programming languages, and quantum programming languages such as the "Q" programming language, Q #, quantum computation language (QCL) or similar programming languages, low-level programming languages, such as the assembly language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for JAVA Virtual Machine (JVM) heap memory tuning, comprising:
    obtaining, by one or more computer processors, a feature vector of an application running on the JVM, wherein the feature vector includes application transaction per second, application topology, available memory space in the JVM, and central processing unit cores number in the JVM;
    inputting, by one or more computer processors, the feature vector to a predictive model trained with historical application data collected in one or more production environments;
    receiving, by one or more computer processors, an output of the predictive model based on the feature vector with at least one memory tuning recommendation for the JVM; and
    tuning, by one or more computer processors, the memory of the JVM based on the at least one memory tuning recommendation providing minimum size of head memory, maximum size of heap memory and garbage collection policy, wherein tuning comprises identifying inactive objects and deleting the identified inactive objects.

2. The computer-implemented method of claim 1, wherein the feature vector of the application further includes at least one of the following features: a type of the application and a data size accessed by the application.

3. The computer-implemented method of claim 1, wherein the historical application data used to train the predictive model is within a predetermined JVM memory tuning range.

4. The computer-implemented method of claim 1, further comprising:
    obtaining, by one or more computer processors, an updated feature vector of the application;
    inputting, by one or more computer processors, the updated feature vector to the predictive model;
    receiving, by one or more computer processors, an updated output of the predictive model based on the updated feature vector with at least one updated memory tuning recommendation; and
    tuning, by one or more processing units, the memory of the JVM based on at least one updated memory tuning recommendation.

5. The computer-implemented method of claim 4, wherein the obtaining of the updated feature vector is executed responsive to a verification that the memory tuning of the JVM based on the at least one memory tuning recommendation is not within a predetermined JVM memory tuning range.

6. The computer-implemented method of claim 1, wherein the predictive model is further trained with the historical application data of the application.

7. A computer program product for JAVA Virtual Machine (JVM) heap memory tuning comprising:
    one or more computer readable storage media and program instructions stored on the one or more computer readable storage media, the stored program instructions comprising: program instructions to obtain a feature vector of an application running on the JVM, wherein the feature vector includes application transactions per second, application topology, available memory space in the JVM, and central processing unit cores number in the JVM;
    program instructions to input the feature vector to a predictive model trained with historical application data collected in one or more production environments;

program instructions to receive an output of the predictive model based on the feature vector with at least one memory tuning recommendation for the JVM; and program instructions to tune the memory of the JVM based on the at least one memory tuning recommendation providing minimum size of heap memory, maximum size of heap memory and garbage collection policy, wherein tuning comprises identifying inactive objects and deleting the identified inactive objects.

8. The computer program product of claim 7, wherein the feature vector of the application further includes at least one of the following features: a type of the application and a data size accessed by the application.

9. The computer program product of claim 7, wherein the historical application data used to train the predictive model is within a predetermined JVM memory tuning range.

10. The computer program product of claim 7, further comprising:

program instructions to obtain an updated feature vector of the application;

program instructions to input the updated feature vector to the predictive model;

program instructions to receive an updated output of the predictive model based on the updated feature vector as at least one updated memory tuning recommendation; and program instructions to tune the memory of the JVM based on the at least one updated memory tuning recommendation.

11. The computer program product of claim 10, wherein the obtaining of the updated feature vector is executed responsive to a verification that the memory tuning of the JVM based on the at least one memory tuning recommendation is not within a predetermined JVM memory tuning range.

12. The computer program product of claim 7, wherein the predictive model is further trained with the historical application data of the application.

13. A computer system for JAVA Virtual Machine (JVM) heap memory tuning comprising:

one or more computer processors;

one or more computer readable storage media; and program instructions stored on the computer readable storage media for execution by at least one of the one or more processors, the stored program instructions comprising:

program instructions to obtain a feature vector of an application running on the JVM, wherein the feature vector includes application transactions per second, application topology, available memory space in the JVM, and central processing unit cores number in the JVM;

program instructions to input the feature vector to a predictive model trained with historical application data collected in one or more production environments;

program instructions to receive an output of the predictive model based on the feature vector with at least one memory tuning recommendation for the JVM; and program instructions to tune the memory of the JVM based on the at least one memory tuning recommendation providing minimum size of heap memory, maximum size of heap memory and garbage collection policy, wherein tuning comprises identifying inactive objects and deleting the identified inactive objects.

14. The computer system of claim 13, wherein the feature vector of the application further includes at least one of the following features: a type of the application and a data size accessed by the application.

15. The computer system of claim 13, wherein the historical application data used to train the predictive model is within a predetermined JVM memory tuning range.

16. The computer system of claim 13, further comprising:

program instructions to obtain an updated feature vector of the application;

program instructions to input the updated feature vector to the predictive model;

program instructions to receive an updated output of the predictive model based on the updated feature vector as at least one updated memory tuning recommendation; and program instructions to tune the memory of the JVM based on the at least one updated memory tuning recommendation.

17. The computer system of claim 16, wherein the obtaining of the updated feature vector is executed responsive to a verification that the memory tuning of the JVM based on the at least one memory tuning recommendation is not within a predetermined JVM memory tuning range.

* * * * *